(12) United States Patent
Wood et al.

(10) Patent No.: US 11,586,517 B1
(45) Date of Patent: Feb. 21, 2023

(54) AUTOMATED INTERNET OF THINGS DEVICE TESTING INCLUDING MODIFYING A DEVICE TABLE TO GENERATE AN ASSOCIATION TABLE

(71) Applicant: INTERNATIONAL BUSINESS MACHINES CORPORATION, Armonk, NY (US)

(72) Inventors: John Jesse Wood, St. Albans (GB); Gareth James Hugh Morgan, Loughton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/649,072

(22) Filed: Jan. 27, 2022

(51) Int. Cl.
*G06F 11/22* (2006.01)
*G06F 11/26* (2006.01)

(52) U.S. Cl.
CPC .......... *G06F 11/2221* (2013.01); *G06F 11/26* (2013.01)

(58) Field of Classification Search
CPC . H04W 4/30; H04W 4/33; H04W 4/38; G06F 11/2221; G06F 11/26; G06F 11/261; G06F 11/263; G06F 11/267; G05B 19/05; G05B 19/054; G05B 19/056; G05B 19/058; G05B 23/00; G05B 23/02; G05B 23/0205; G05B 23/0208; G05B 23/0218; G05B 23/0259; G01D 2204/24; G01R 31/00; G01R 31/003; G01R 31/28; G01R 31/282; G01R 31/2825; G01R 31/2829
See application file for complete search history.

(56) References Cited

U.S. PATENT DOCUMENTS

| | | | | |
|---|---|---|---|---|
| 6,167,352 A | * | 12/2000 | Kanevsky | G01R 31/318371 714/33 |
| 10,551,838 B2 | | 2/2020 | Liu | |
| 2011/0153258 A1 | * | 6/2011 | Tsu | G05B 23/0213 702/123 |
| 2012/0136608 A1 | * | 5/2012 | Yoshinaga | G06F 11/263 702/108 |

(Continued)

FOREIGN PATENT DOCUMENTS

| | | |
|---|---|---|
| EP | 3868273 A1 | 8/2021 |
| KR | 20210012200 A | 2/2021 |

OTHER PUBLICATIONS

Anonymous, "System and Method to "Replace Me"," IP.com Prior Art Database Technical Disclosure, IP.om No. IPCOM000243799D, Oct. 17, 2015, 3 pages.

*Primary Examiner* — Joseph O Schell
(74) *Attorney, Agent, or Firm* — Matthew Zehrer

(57) ABSTRACT

A method, system, and computer program product for automated testing of Internet of Things devices are provided. The method generates a device table for a set of devices. The device table includes a set of inputs and a set of controllable outputs for each device. A set of input signals are detected for a device for a subset of inputs associated with the device. The set of input signals are detected from one or more controllable outputs of a subset of devices. The device table is modified based on the set of input signals and the one or more controllable outputs to generate an association table representing a relation of the subset of inputs with the one or more controllable outputs. The method detects a fault in one or more device of the set of devices based on a test input signal and the association table.

20 Claims, 6 Drawing Sheets

(56) References Cited

U.S. PATENT DOCUMENTS

| | | | |
|---|---|---|---|
| 2016/0239401 A1* | 8/2016 | Li | G06F 11/3608 |
| 2017/0030803 A1* | 2/2017 | Hung | G01M 13/003 |
| 2020/0217542 A1* | 7/2020 | Nonaka | F24F 11/38 |
| 2021/0080982 A1* | 3/2021 | Mehta | G06F 11/3062 |
| 2021/0200200 A1 | 7/2021 | Akula | |

* cited by examiner

US 11,586,517 B1

AUTOMATED INTERNET OF THINGS DEVICE TESTING INCLUDING MODIFYING A DEVICE TABLE TO GENERATE AN ASSOCIATION TABLE

BACKGROUND

Devices within home and office settings are increasingly equipped with input components, output components, and sensors. These devices can include communications technology enabling their operation as Internet of Things (IoT) devices. IoT devices may communicate some data between devices or systems via communications infrastructure and protocols. Some devices include functionality to monitor their own inputs and outputs to internally determine when a sensor, input, or output of a device has failed.

SUMMARY

According to an embodiment described herein, a computer-implemented method for automated testing of Internet of Things devices is provided. The method generates a device table for a set of devices. The device table includes a set of inputs and a set of controllable outputs for each device of the set of devices. A set of input signals are detected for a device. The set of input signals are detected for a subset of inputs associated with the device. The set of input signals are detected from one or more controllable outputs of the set of controllable outputs of a subset of devices of the set of devices. The device table is modified based on the set of input signals and the one or more controllable outputs to generate an association table representing a relation of the subset of inputs of the device with the one or more controllable outputs of the subset of devices. The method detects a fault in one or more device of the set of devices based on a test input signal and the association table.

According to an embodiment described herein, a system for automated testing of Internet of Things devices is provided. The system includes one or more processors and a computer-readable storage medium, coupled to the one or more processors, storing program instructions that, when executed by the one or more processors, cause the one or more processors to perform operations. The operations generate a device table for a set of devices. The device table includes a set of inputs and a set of controllable outputs for each device of the set of devices. A set of input signals are detected for a device. The set of input signals are detected for a subset of inputs associated with the device. The set of input signals are detected from one or more controllable outputs of the set of controllable outputs of a subset of devices of the set of devices. The device table is modified based on the set of input signals and the one or more controllable outputs to generate an association table representing a relation of the subset of inputs of the device with the one or more controllable outputs of the subset of devices. The operations detect a fault in one or more device of the set of devices based on a test input signal and the association table.

According to an embodiment described herein, a computer program product for automated testing of Internet of Things devices is provided. The computer program product includes a computer-readable storage medium having program instructions embodied therewith, the program instructions being executable by one or more processors to cause the one or more processors to generate a device table for a set of devices. The device table includes a set of inputs and a set of controllable outputs for each device of the set of devices. A set of input signals are detected for a device. The set of input signals are detected for a subset of inputs associated with the device. The set of input signals are detected from one or more controllable outputs of the set of controllable outputs of a subset of devices of the set of devices. The device table is modified based on the set of input signals and the one or more controllable outputs to generate an association table representing a relation of the subset of inputs of the device with the one or more controllable outputs of the subset of devices. The computer program product detects a fault in one or more device of the set of devices based on a test input signal and the association table.

DETAILED DESCRIPTION

Figure 1:
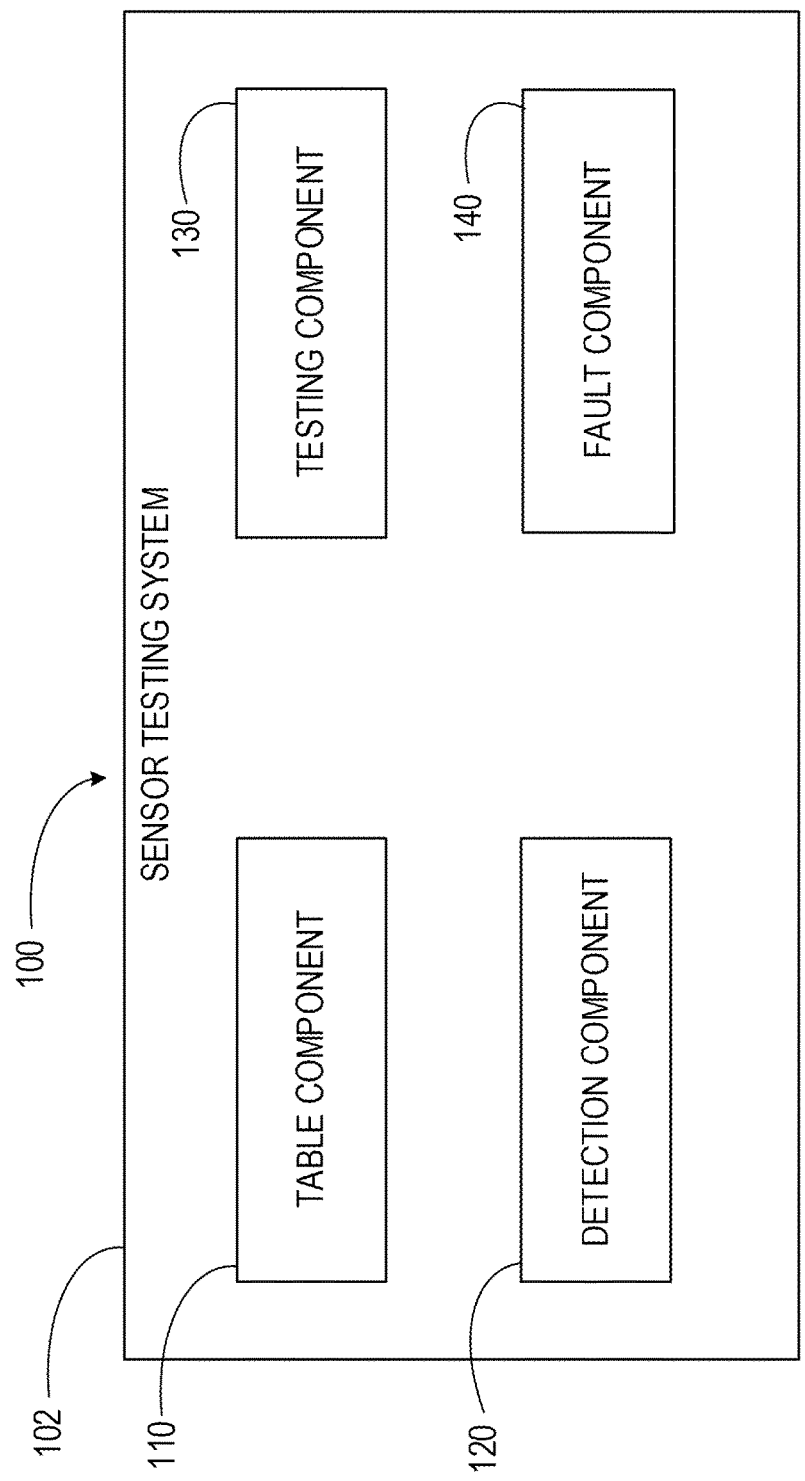
FIG. 1 depicts a block diagram of a computing environment for implementing concepts and computer-based methods, according to at least one embodiment.

The present disclosure relates generally to methods for device testing. More particularly, but not exclusively, embodiments of the present disclosure relate to a computer-implemented method for automated testing of IoT devices. The present disclosure relates further to a related system for device testing, and a computer program product for operating such a system.

As stated previously, devices of varied type and function, within the home and office, increasingly include sensors, inputs, and outputs. These devices may include connectivity hardware and functionality within an IoT infrastructure. IoT devices can operate independently, and use included connectivity functionality to communicate with users of the devices and with backend services associated with manufacturers of the devices. For example, IoT devices may use connectivity functionality to provide additional information to users such as digital assistants providing internet search functionality. Digital thermostats may provide weather and time information and remote connectivity to users seeking to change heating and cooling settings while away from the home or office.

IoT devices may monitor their own inputs and outputs to determine internal sensor and other failures within the device. For example, a telephone may monitor when a charging cable is connected, when the charging cable is providing power, and a rate of charge based on the functioning of the charging cable, plug, or telephone charging port. Similarly, some IoT devices monitor inputs/outputs and perform some diagnostics to provide information to the user. However, internal diagnostic functionality of IoT devices can be limited or non-existent. Further, internal diagnostics of IoT devices can be limited by software and hardware of each IoT device and specific to the device. Given the limitations of current smart and IoT devices, users of such devices may not discover that a device has broken or non-functional inputs or outputs until the device is being directly used. Similarly, some lesser used functionality, inputs, or outputs may escape detection despite use of the device in other contexts. Even when a fault or failure is detected, it may be challenging to isolate what issues are affecting the device or causing the failure. For example, it may be difficult to determine whether a part or component of the device is broken, whether a software error cause the failure, or whether a connected peripheral is at fault. Due to the difficulty of determining a cause of the fault, it may be difficult to identify: whether the fault may be fixed, and a method to perform such a fix.

Embodiments of the present disclosure can enable fault detection among interconnected devices. Some embodiments of the present disclosure provide a system or environment enabling connected devices to learn how to test their own inputs and outputs. Embodiments of the present disclosure enable interconnected devices to use external sources and signals of other interconnected devices within a network to perform testing on their own inputs and outputs. Embodiments of the present disclosure enable use of external sources and signals to test inputs and outputs in isolation. Some embodiments of the present disclosure enable devices to detect internal failures or faults in inputs and outputs or detect degradation in performance of the same.

Some embodiments of the concepts described herein may take the form of a system or a computer program product. For example, a computer program product may store program instructions that, when executed by one or more processors of a computing system, cause the computing system to perform operations described above with respect to the computer-implemented method. By way of further example, the system may comprise components, such as processors and computer-readable storage media. The computer-readable storage media may interact with other components of the system to cause the system to execute program instructions comprising operations of the computer-implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a sensor testing system 102. The sensor testing system 102 may comprise a table component 110, a detection component 120, a testing component 130, and a fault component 140. The table component 110 generates and modifies device tables and association tables to represent associations between inputs and outputs of a set of devices. The detection component 120 detects input signals received by and output generated by devices of a set of devices. The testing component 130 performs input and output testing of the set of devices based on device tables and association tables. The fault component 140 determines faults of input or output sensors of devices based on results from the testing component 130. Although described with distinct components, it should be understood that, in at least some embodiments, components may be combined or divided, and/or additional components may be added without departing from the scope of the present disclosure.

Figure 2:
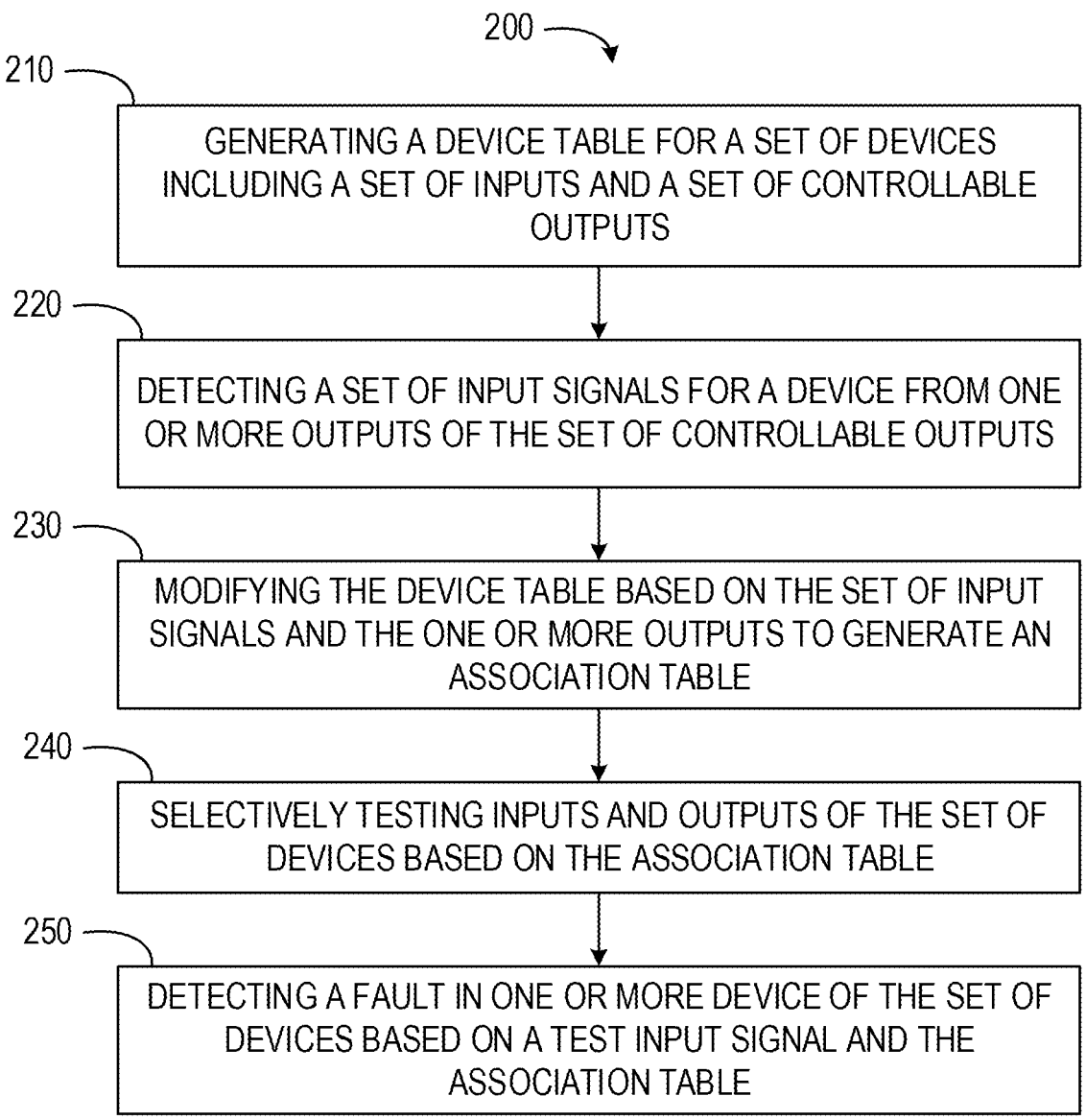
FIG. 2 depicts a flow diagram of a computer-implemented method for automated IoT device testing, according to at least one embodiment.

Referring now to FIG. 2, a flow diagram of a computer-implemented method 200 is shown. The computer-implemented method 200 is a method for automated IoT device testing. In some embodiments, the computer-implemented method 200 may be performed by one or more components of the computing environment 100, as described in more detail below.

At operation 210, the table component 110 generates a device table for a set of devices. In some embodiments, the device table includes a set of inputs and a set of outputs for each device of the set of devices. The set of outputs included in the device table may be a set of controllable outputs. Device inputs may be generated by a component that monitors an environment surrounding the device. Device outputs may be generated by a component of the device that produces an observable effect on an environment surrounding the device.

The table component 110 may generate the device table as including a designation for each device of the set of devices. The designation for the set of devices may be generated in a first column of the device table. The device designation may be a device name, a device address, a device number, or any other device designation. In some embodiments, the table component 110 generates the device table including a number of inputs for each device and a number of outputs for each device. The number of inputs may be generated in a second column of the device table, while the number of outputs may be generated in a third column of the device table. In some instances, the device table may include a device type along with the device designation. The device table may also include an input type and output type for each input and output included within the device table. An example of the device table is shown as Example Table 1, below.

EXAMPLE TABLE 1

| Device Designation | Number of inputs | Number of controllable Outputs |
|---|---|---|
| 1 | 1 | 1 |
| 2 | 2 | 3 |
| 3 | 1 | 2 |
| 4 | 1 | 1 |

The Example Table 1 includes a row for each of four devices (e.g., Device Designations 1 through 4). Device 1 includes 1 input and 1 output.

At operation 220, the detection component 120 may detect a set of input signals for a device. The set of input signals may be detected for a subset of inputs of the set of inputs associated with the device. In some embodiments, the set of input signals is detected from one or more outputs or one or more controllable outputs of a subset of devices of the set of devices. The detection component 120 may detect the set of input signals for the device by triggering each device of the set of devices to turn on each controllable output in sequence. For example, where the detection component 120 is detecting the set of input signals for a first device, the detection component 120 may trigger the second device to start and stop each of the three controllable outputs shown in Table 1, with one controllable output of the three controllable outputs operating at a time. Once each of the controllable outputs of the second device have been initiated and tested, the detection component 120 may initiate and test the controllable outputs of the remaining third and fourth devices.

In some embodiments, the detection component 120 repeats the detection process for the set of input signals. In such instances, the detection component 120 detects input signals for each device of the set of devices. The input signals may be detected from controllable outputs of at least a portion of devices of the set of devices. The portion of devices used to detect the input signals may be any one or more of the devices having a controllable output which is detectable by the input device or input devices of each device.

At operation 230, the table component 110 may modify the device table based on the set of input signals and the one or more outputs to generate an association table. In some embodiments, the association table represents a relation of the subset of inputs of the device with the one or more outputs of the subset of devices.

In embodiments where the detection component 120 repeats the detection process for each device of the set of devices, the table component 110 may modify the association table to include relationships for all inputs of the set of inputs and all outputs of the set of outputs. In such instances, all outputs of the set of devices are associated with at least one input of another device of the set of devices within the association table.

For example, where the sensor testing system 102 is testing a set of devices including a television, a home hub, a smart lightbulb, and a camera, the table component 110 may modify the device table, as represented below in Example Table 2. The television may have input as an infra-red sensor and outputs as audio and video playback, played through speakers and a screen, respectively. The home hub may have a microphone sensor as input and audio as a controllable output played through a speaker. The smart lightbulb may have no input sensors but may emit light as a controllable output. The camera may detect light as an input but have no connected controllable outputs. Thus, the table component 110 may modify the device table to include pairs of inputs and outputs of the above-referenced devices as shown below in Table 2. Although described above and shown below as input and output pairs, the table component 110 may modify the device table to depict associations between multiple output combinations for each input.

EXAMPLE TABLE 2

| Input | Output |
| --- | --- |
| TV IR-sensor | Smart Lightbulb |
| Home Hub Microphone | TV Speakers |
| Camera | TV screen |
| Camera | Smart Lightbulb |

In some embodiments, the table component 110 may verify that the outputs have associated inputs in the association table. Where an output does not appear in the association table as being associated with at least one input, the detection component 120 and the table component 110 may perform operations 210, 220, and 230 in reverse order for the output. In some embodiments, performing these operations again may ensure that each output is associated with at least one input.

In some embodiments, for each output that appears once or less, the detection component 120 may request each device and input, in series or in sequence, to monitor their input to detect a change. In some instances, the change is detected from a background signal, described in more detail below. In some embodiments, the detection component 120 progressively increases output times and output values during testing until a detection threshold is reached. The detection threshold may be a time threshold or an output value threshold. The detection component 120 may repeat until measurable changes are determined for the output or the output is determined to be unmeasurable by available inputs of the set of devices.

Once completed, the association table provides input/output pairs. Each output can be used to test at least one input. In some instances, each output and input are tested until they appear in at least two separate input/output pairs. In some instances, each input and output are tested until the input or output appear in a predetermined maximum number of pairs. The list of input/output pairs may be prioritized, such that the outputs are tested first when they do not already appear in an input/output pair.

At operation 240, the testing component 130 selectively tests inputs and outputs of the set of devices based on the association table. For example, as shown in Example Table 2, the testing component 130 may test the IR sensor of the television by turning on and off the smart lightbulb. Each device may emit detectable signals when it is emitting from one of its outputs. The testing component 130 may determine whether it is appropriate to test a device based on the outputs currently emitting from one or more devices of the set of devices. In some embodiments, when a device output is emitting, the testing component 130 may detect the currently emitting output and select a device with a corresponding input to test against the currently emitting output. In some instances, a set of outputs are currently emitting. In such instances, the testing component 130 may selectively determine a device input to test based on the set of currently emitting outputs.

For example, the testing component 130 may select a first device and first input to test and exclude testing of a second device and second input, where the first input may be suitably tested despite simultaneous emitting of the set of currently emitting outputs and the second input may not be suitably tested due to interference between the set of currently emitting outputs. For example, the testing component 130 may selectively test an IR sensor of the television where the television playing simultaneous audio and video and speakers of the hub home device are currently emitting an announcement. In the example above, the testing component 130 may determine that testing the hub home microphone is inappropriate due to the output of the television and the hub home speakers causing potential interference.

In some embodiments, the testing component 130 may access a device log to selectively test inputs and outputs of the set of devices. In such embodiments, the testing component 130 may access the device log and determine a last test time for an input. The testing component 130 may determine that the last test time exceeds a testing interval for the input or the device. The testing component 130, after determining the last test time exceeds the testing interval may request a test from an output associated with the input to be tested. Once the input is tested, the testing component 130 may change an input line of the device log to represent the completed test. The testing component 130 may change the input line to reflect passage or failure of the test. The testing component 130 may note that the input or output was operating within an expected operating range, and a specific value for the operation.

In some embodiments, the testing component 130 may selectively test the input at a time that is convenient to both devices. For example, the testing component 130 may selectively test the input at a time at which both devices are not in use. In some embodiments, the testing component 130 may selectively test the input based on a designated test time. In such embodiments, the testing component 130 may selectively test inputs and outputs during a predetermined time during the day (i.e., work hours) when residents are out of the home and unlikely to be disturbed by testing of one or more inputs and outputs.

In some embodiments, the testing component 130 identifies a test failure of a first test during the selective testing. The test failure may be associated with the device. In some instances, the test failure is associated with one or more devices of the set of devices.

In some embodiments, the testing component 130 performs a second test for the device or the one or more devices. The second test may differ from the first test based on the association table.

At operation 250, the fault component 140 may detect a fault in one or more devices of the set of devices. In some embodiments, the fault is detected based on a test input signal and the association table. In some instances, the fault is detected as a failure within a device log given a failure of a selective test of an input or output. Where the fault component 140 detects the fault, the fault component 140 may re-test both the input and the output device associated with the fault using alternative pairs of inputs or outputs with the input or output designated as failing or being at fault. The testing component 130 may cooperate with the fault component 140 to run alternative tests and establish a persistent fault for one or more of the inputs and outputs by detecting a subsequent failure during the alternate test. Once the fault is established based on a subsequent test, the fault component 140 may mark the input or output as faulty and in need of repair. The input or output may be marked as faulty in one or more of the device table, the association table, or the device log. Once marked as faulty, the fault component 140 may generate an alert of the failure. The fault component 140 may then display the alert through one or more devices of the set of devices, transmit the alert to the user (e.g., text, notification, or email), or cause display of the alert on a user interface associated with the sensor testing system 102.

Figure 3:
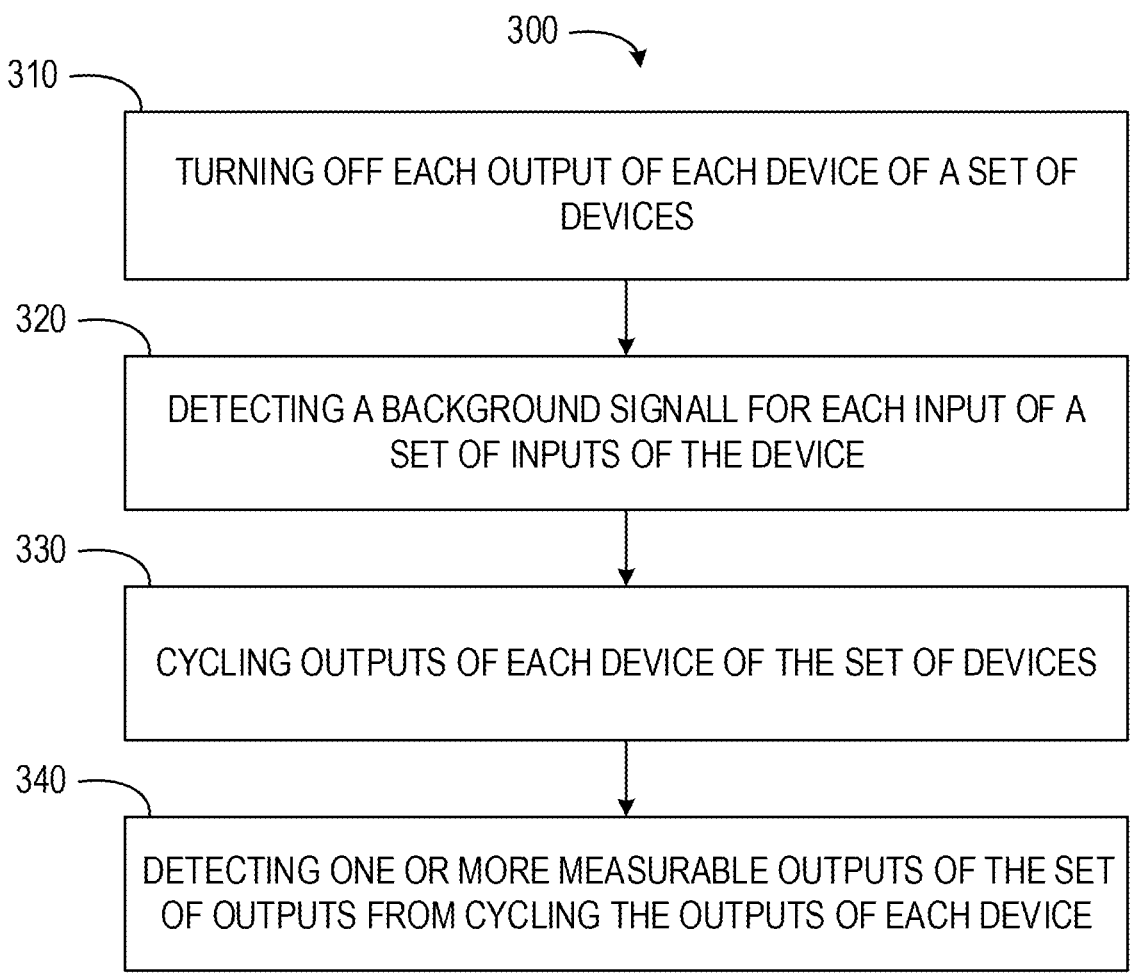
FIG. 3 depicts a flow diagram of a computer-implemented method for automated IoT device testing, according to at least one embodiment.

FIG. 3 shows a flow diagram of an embodiment of a computer-implemented method 300 for automated IoT device testing. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the detection component 120 may turn off each output of each device of the set of devices. In some embodiments, the detection component 120 may turn off each controllable output of each device of the set of devices. Once the controllable outputs of the other devices of the set of devices have been shut off, the detection component 120 may turn off controllable outputs of a device under test. In some embodiments, the detection component 120 causes each output of each device to turn off during an initiation of the sensor testing system 102.

In operation 320, the detection component 120 may detect a background signal for each input of the subsets of inputs of the device. The detection component 120 may detect the background signal of each input at the same time. In some instances, the detection component 120 may detect the background signal of each input in a series or in a sequence. The detection component 120 may detect the background signal through each input at a single measurement. In some instances, the detection component 120 detects the background signal by performing a set of detection operations and averaging background signals from each detection operation for a single input. Where the detection component 120 detects the background signal using multiple measurements, the detection component 120 may perform measurements at different times of day, on different days of the week, and for different amounts of measurement time. In such instances, the detection component 120 may determine an average background signal for each input and average out human interference and environmental factors from the background signal.

In operation 330, the detection component 120 may cycle outputs of each device of the set of devices. Cycling an output may transition the output between an off and an on status. Cycling of each output may be performed one or more times. The detection component 120 may work through a sequence of devices and outputs of the set of devices and associated set of controllable outputs. While cycling through the outputs of each device, the detection component 120 may monitor the input of a device to detect how the signal changes from the background signal. The detection component 120 may cycle through the outputs for varying periods of time, above an output time threshold. The detection component 120 may also cycle through the outputs at varying output levels above an output value threshold.

The detection component 120 may repeatedly cycle through each device and each output of each device. In some embodiments, the detection components 120 repeats the cycle, varying the output time during each cycle, and varying each output value during each cycle. By repeating the cycle with variations, the detection component 120 removes short term effects that may affect the relationship between a received signal and an output emitted by each device.

In operation 340, the detection component 120 may detect one or more measurable outputs of the set of outputs. In some embodiments, the detection component 120 detects measurable outputs from the set of controllable outputs being cycled between off and on statuses.

In some embodiments, the detection component 120 detects the one or more measurable outputs by detecting one or more signal changes. The one or more signals may be detected as a change from the background signal for at least one input of the subset of inputs of the device.

In some embodiments, the detection component 120 may determine that at least one signal change of the one or more signal changes is repeatable. In some instances, the detection component 120 determines the signal change is repeatable during repeated cycling of the outputs of each device of the set of devices.

Once the one or more measurable outputs are detected, the table component 110 generates a background table for the device. In some instances, the detection component 120 and the table component 110 may cooperate to generate a background column with background values for each relationship between inputs and outputs of devices of the set of devices. An example background table or background column is depicted below in Example Table 3. The background value may be an expected change for the measurable and repeatable signal from the background signal.

EXAMPLE TABLE 3

| Input | Output | Change |
|---|---|---|
| 1 | Device 1, Output 1 | Background +2 |
| 1 | Device 3, Output 2 | Background +1 |
| 2 | Device 1, Output 1 | Background +4 |
| 2 | Device 4, Output 1 | Background −2 |

In some embodiments, the table component 110 integrates the background column or background table into the association table generated in operation 230.

Figure 4:
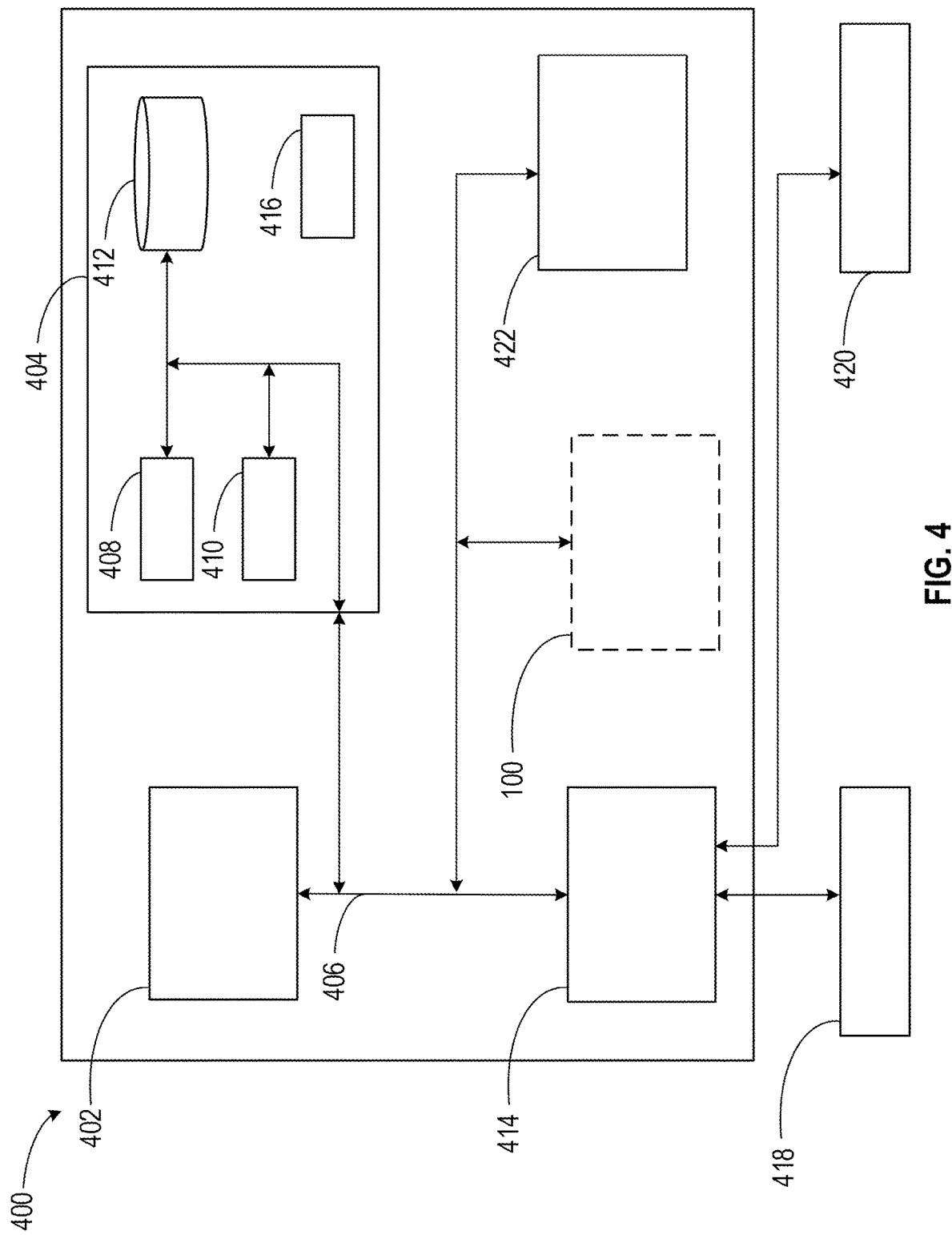
FIG. 4 depicts a block diagram of a computing system for automated IoT device testing, according to at least one embodiment.

Embodiments of the present disclosure may be implemented together with virtually any type of computer, regardless of the platform is suitable for storing and/or executing program code. FIG. 4 shows, as an example, a computing system 400 (e.g., cloud computing system) suitable for executing program code related to the methods disclosed herein and for automated IoT device testing.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the table component 110, the detection component 120, the testing component 130, and the fault component 140, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
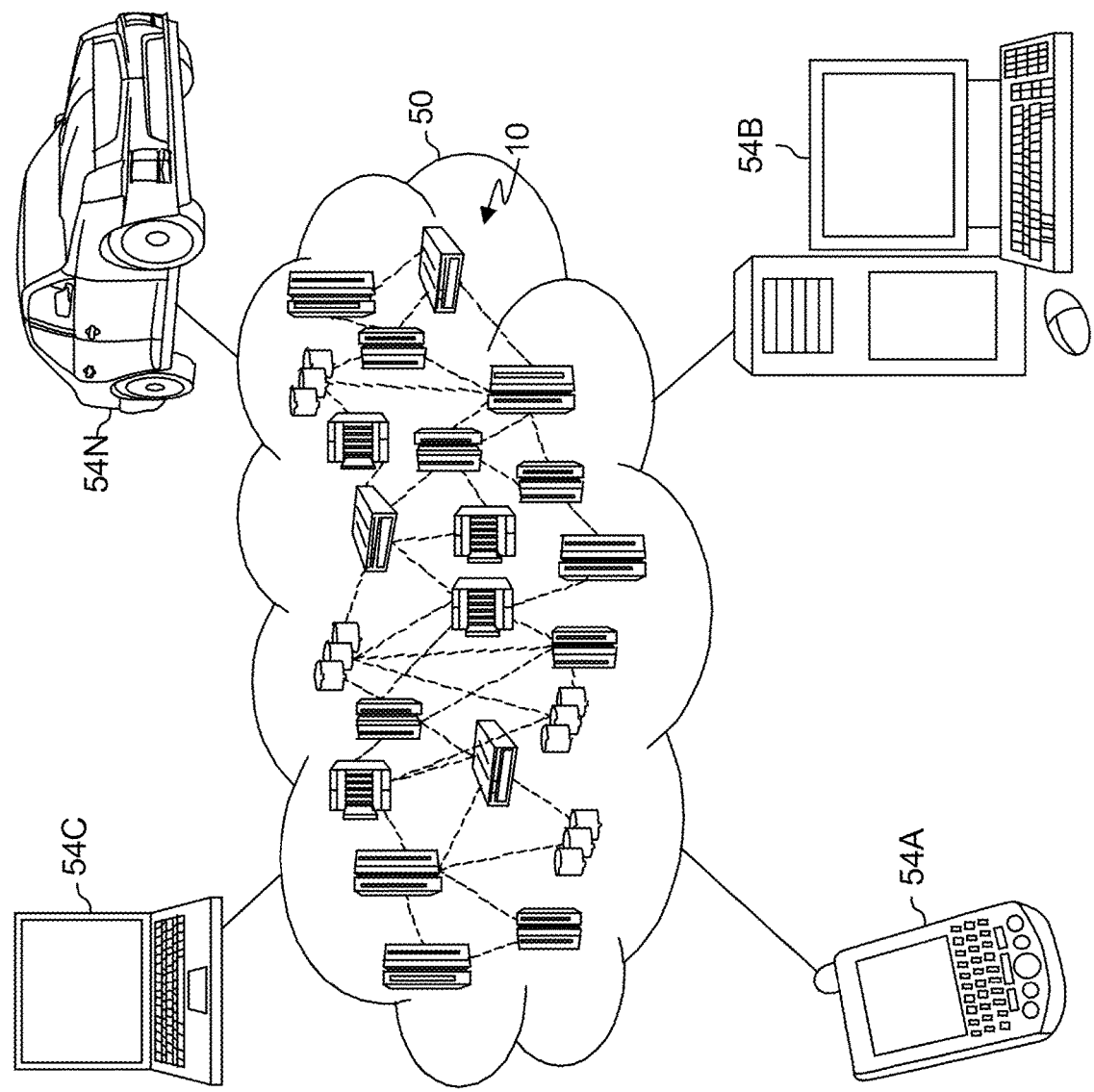
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
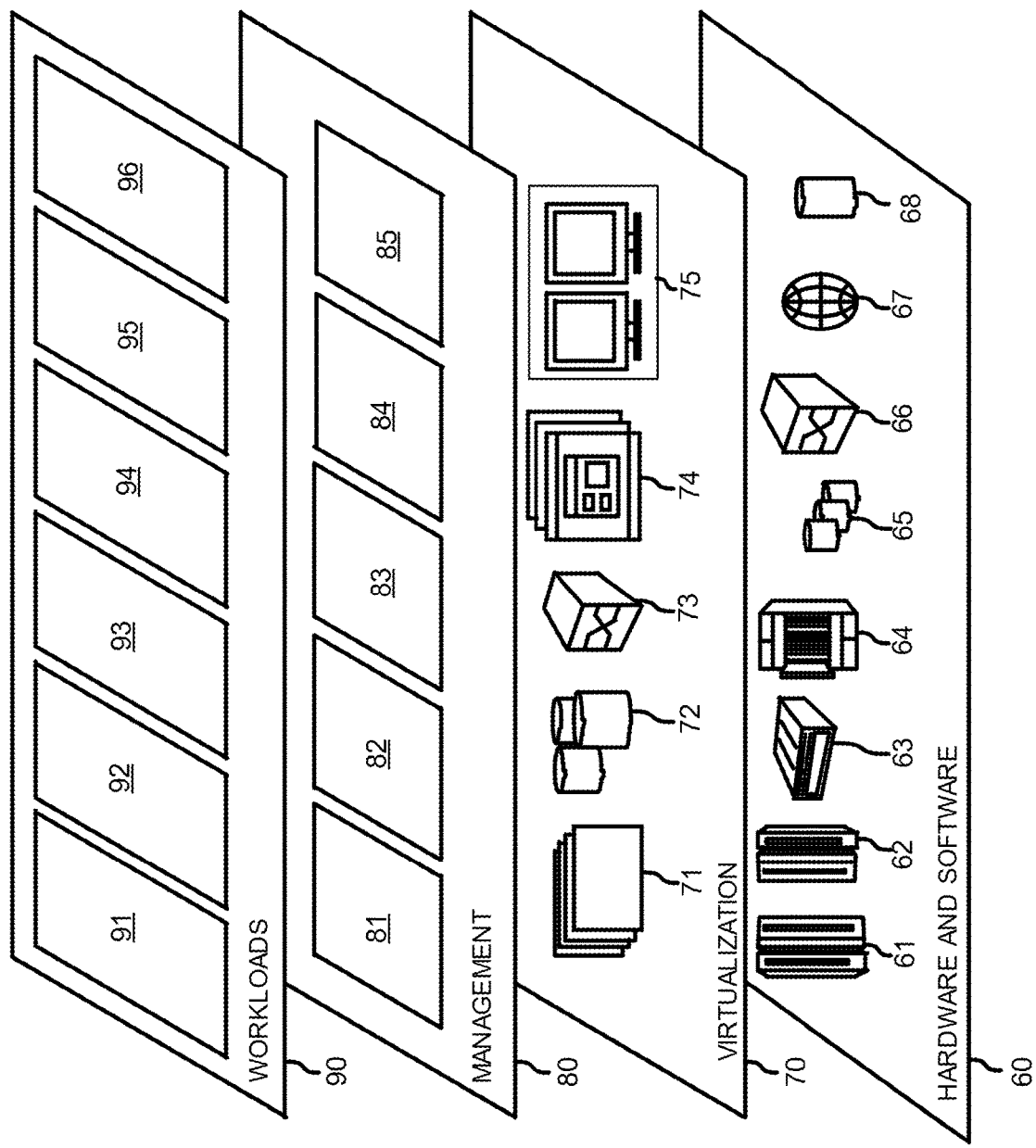
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and device sensor testing processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating a device table for a set of devices, the device table including a set of inputs and a set of controllable outputs for each device of the set of devices;
   detecting a set of input signals for a device, the set of input signals detected for a subset of inputs of the set of inputs associated with the device, the set of input signals detected from one or more controllable outputs of the set of controllable outputs of a subset of devices of the set of devices;
   modifying the device table based on the set of input signals and the one or more controllable outputs to generate an association table representing a relation of the subset of inputs of the device with the one or more controllable outputs of the subset of devices; and
   detecting a fault in one or more devices of the set of devices based on a test input signal and the association table.

2. The method of claim 1, further comprising:
   turning off each controllable output of each device of the set of devices; and
   detecting a background signal for each input of the subset of inputs of the device.

3. The method of claim 2, further comprising:
   detecting one or more measurable outputs of the set of controllable outputs.

4. The method of claim 3, wherein detecting the one or more measurable outputs further comprises:
   cycling the controllable outputs of the set of devices;
   detecting one or more signal changes from the background signal for at least one input of the subset of inputs of the device; and
   determining at least one signal change of the one or more signal changes is repeatable.

5. The method of claim 1, further comprising:
   detecting input signals for each device, the input signals detected from controllable outputs of at least a portion of devices of the set of devices; and
   modifying the association table to include relationships for all inputs of the set of inputs and all controllable outputs of the set of controllable outputs such that all outputs of the set of devices are associated with at least one input of another device of the set of devices.

6. The method of claim 1, wherein detecting the fault further comprises:
   selectively testing inputs and controllable outputs of the set of devices based on the association table.

7. The method of claim 6, wherein detecting the fault further comprises:

identifying a test failure of a first test during the selective testing, the test failure associated with the one or more devices; and performing a second test for the one or more devices, the second test differing from the first test based on the association table.

8. A system, comprising:

one or more processors; and a computer-readable storage medium, coupled to the one or more processors, storing program instructions that, when executed by the one or more processors, cause the one or more processors to perform operations comprising:

generating a device table for a set of devices, the device table including a set of inputs and a set of controllable outputs for each device of the set of devices;

detecting a set of input signals for a device, the set of input signals detected for a subset of inputs of the set of inputs associated with the device, the set of input signals detected from one or more controllable outputs of the set of controllable outputs of a subset of devices of the set of devices;

modifying the device table based on the set of input signals and the one or more controllable outputs to generate an association table representing a relation of the subset of inputs of the device with the one or more controllable outputs of the subset of devices; and detecting a fault in one or more device of the set of devices based on a test input signal and the association table.

9. The system of claim 8, wherein the operations further comprise:

turning off each controllable output of each device of the set of devices; and detecting a background signal for each input of the subset of inputs of the device.

10. The system of claim 9, wherein the operations further comprise:

detecting one or more measurable outputs of the set of controllable outputs.

11. The system of claim 10, wherein detecting the one or more measurable outputs further comprises:

cycling the controllable outputs of the set of devices;

detecting one or more signal changes from the background signal for at least one input of the subset of inputs of the device; and determining at least one signal change of the one or more signal changes is repeatable.

12. The system of claim 8, wherein the operations further comprise:

detecting input signals for each device, the input signals detected from controllable outputs of at least a portion of devices of the set of devices; and modifying the association table to include relationships for all inputs of the set of inputs and all controllable outputs of the set of controllable outputs such that all outputs of the set of devices are associated with at least one input of another device of the set of devices.

13. The system of claim 8, wherein detecting the fault further comprises:

selectively testing inputs and controllable outputs of the set of devices based on the association table.

14. The system of claim 13, wherein detecting the fault further comprises:

identifying a test failure of a first test during the selective testing, the test failure associated with the one or more device; and performing a second test for the one or more device, the second test differing from the first test based on the association table.

15. A computer program product comprising a computer readable storage medium having program instructions embodied therewith, the program instructions being executable by one or more processors to cause the one or more processors to perform operations comprising:

generating a device table for a set of devices, the device table including a set of inputs and a set of controllable outputs for each device of the set of devices;

detecting a set of input signals for a device, the set of input signals detected for a subset of inputs of the set of inputs associated with the device, the set of input signals detected from one or more controllable outputs of the set of controllable outputs of a subset of devices of the set of devices;

modifying the device table based on the set of input signals and the one or more controllable outputs to generate an association table representing a relation of the subset of inputs of the device with the one or more controllable outputs of the subset of devices; and detecting a fault in one or more device of the set of devices based on a test input signal and the association table.

16. The computer program product of claim 15, wherein the operations further comprise:

turning off each controllable output of each device of the set of devices; and detecting a background signal for each input of the subset of inputs of the device.

17. The computer program product of claim 16, wherein the operations further comprise:

detecting one or more measurable outputs of the set of controllable outputs.

18. The computer program product of claim 17, wherein detecting the one or more measurable outputs further comprises:

cycling the controllable outputs of the set of devices;

detecting one or more signal changes from the background signal for at least one input of the subset of inputs of the device; and determining at least one signal change of the one or more signal changes is repeatable.

19. The computer program product of claim 15, wherein the operations further comprise:

detecting input signals for each device, the input signals detected from controllable outputs of at least a portion of devices of the set of devices; and modifying the association table to include relationships for all inputs of the set of inputs and all controllable outputs of the set of controllable outputs such that all outputs of the set of devices are associated with at least one input of another device of the set of devices.

20. The computer program product of claim 15, wherein detecting the fault further comprises:

selectively testing inputs and controllable outputs of the set of devices based on the association table;

identifying a test failure of a first test during the selective testing, the test failure associated with the one or more device; and performing a second test for the one or more device, the second test differing from the first test based on the association table.

\* \* \* \* \*